July 11, 1944. W. A. SCHULZE ET AL 2,353,509
PROCESS FOR HYDROCARBON CONVERSION
Filed Feb. 6, 1942
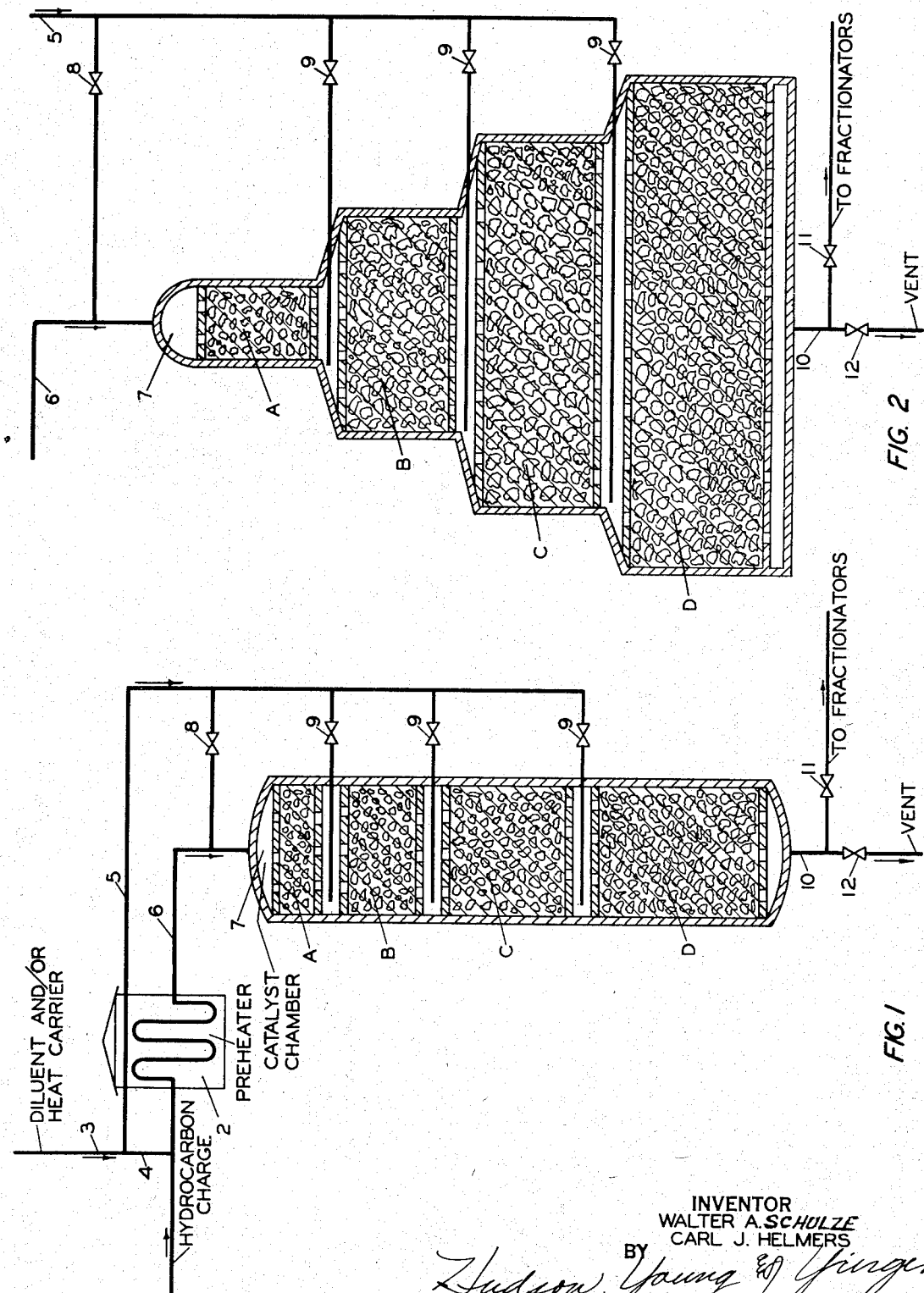
INVENTOR
WALTER A. SCHULZE
CARL J. HELMERS
BY
Hudson, Young & Yinger
ATTORNEY Patented July 11, 1944

2,353,509

UNITED STATES PATENT OFFICE 2,353,509

PROCESS FOR HYDROCARBON CONVERSION

Walter A. Schulze and Carl J. Helmers, Bartlesville, Okla., assignors to Phillips Petroleum Company, a corporation of Delaware Application February 6, 1942, Serial No. 429,813

12 Claims. (Cl. 196—52)

This invention relates to the catalytic treatment of hydrocarbons, and more particularly it relates to such catalytic endothermic reactions as cracking, dehydrogenation, reforming, and the like, which are promoted by contact catalyst masses.

One of the main problems in catalytic reactions promoted by solid contact catalysts which occur with absorption of heat is to maintain the temperature at the desired level throughout the whole catalyst mass. If the charge is preheated so that it has the desired temperature at the entrance of the catalyst bed, a serious drop in temperature is ordinarily noted in the latter parts of the catalyst traversed by the materials undergoing conversion. This diminishing of the temperature of the charge as it passes through the catalyst mass is probably caused to a large extent by the endothermic nature of the reaction, and it is often magnified by the fact that relatively large catalyst masses must be employed to insure the proper contact time necessary for the hydrocarbon conversion. As the optimum temperature may not be maintained in a large portion of the catalyst chamber, there is a decrease in conversion which not only may lower the yield to an economically unsatisfactory level but may produce a product of inferior quality. If it is attempted to maintain the average temperature of the reactants in the desired range throughout the catalyst by introduction at temperatures above the optimum level, the amount of superheating of the feed stock that is necessary will often cause undesirable thermal cracking in the preheater and in the lines to the catalyst chamber. Systems have been described for indirect heat exchange within the catalyst mass by means of radiators and the like carrying heat transfer fluids, but the complexity of such equipment and of its operation introduces tremendous engineering problems and greatly increased process costs.

The addition to the hydrocarbon charge of relatively heat-stable gases and vapors which are substantially unconverted at reaction conditions is one means of reducing endothermic heat losses within the catalyst bed. These diluents which may be premixed with the reactants or added thereto at or even somewhat above conversion temperatures then serve to maintain or restore conversion temperatures by supplying sensible heat directly to the reactants within the catalyst mass. It is often desirable to introduce substantially inert heat carriers into the conversion zone through a plurality of inlets spaced along the side of the catalyst chamber. The disadvantage in this procedure, however, is the factor of dilution by the added volume of such material and its effect on vapor velocity and the effective contact or reaction time of the reactants within the catalyst. For instance, as the reaction mixture passes through the catalyst mass, it becomes increasingly more dilute with respect to the hydrocarbon reactant because of the continued introduction of the heat carrier diluent. This dilution may reach a point where the contact time between the hydrocarbon and the catalyst is so small as to materially lower the efficiency of the conversion and the quality of the product.

The present invention has for one object an improved process for the maintenance of a constant high conversion level throughout the catalyst mass in a catalytic endothermic reaction of the type described.

Another object is to provide an improved process for the use of substantially inert heat carrier fluids in maintaining conversion temperatures within contact catalyst masses.

A further object of this invention is to provide an improved process for simultaneously maintaining the contact time between catalyst and reactant and the conversion temperature within a narrow range in a catalytic endothermic reaction. These and other objects and advantages of the invention will be obvious from the disclosure to follow.

A still further object of the invention is to provide a novel arrangement of the catalyst mass for endothermic conversions of hydrocarbons wherein successive increments of the mass have increasing volume as the volume of the vapor stream traversing the bed increases.

Another object of this invention is to provide a process for the endothermic conversion of hydrocarbons in a catalyst bed wherein intermediate injections of inert heating medium are correlated with the increasing volume of catalyst in the direction of flow to maintain the reaction temperature.

We have now discovered that in catalytic endothermic conversions wherein substantially inert heat carrier fluids are added at a plurality of inlets along the catalyst chamber in order to maintain the temperature, the contact time between catalyst and hydrocarbon can be kept approximately constant by increasing the volume of catalyst in successive increments of the conversion zone by an amount proportionate to the increase in the total vapor volume. Thus as the total volume of the reaction mixture increases, and as it becomes more dilute with respect to the convertible material, it comes in contact with a proportionately larger volume of catalyst, and the contact time between the hydrocarbon feed and the catalyst remains satisfactorily uniform throughout the whole catalyst mass. Hence, by means of this process, a very high degree of conversion is obtained in each of the increments of the catalyst mass. Also, since the proper conditions necessary for the desired conversion are more nearly approached throughout the whole catalyst bed, a product of better quality is obtained. Another advantage of this process is that its objects are achieved without the employment of any unduly complex equipment and consequently the engineering problems and process costs are cut to a minimum.

In one specific embodiment, our process comprises the steps of (1) preheating a hydrocarbon charge, with or without previous addition of relatively inert or refractory diluent, to substantially conversion temperature; (2) passing the charge through a body of catalyst composed of a plurality of more or less separate sections of progressively increasing volume in the direction of vapor flow; (3) adding at one or more points between said catalyst sections superheated substantially inert diluent to counteract endothermal heat loss within the catalyst body; and (4) separating and recovering conversion products from the catalyst effluent.

These operations may be performed in accordance with the flow diagram of Figure 1. This diagram shows an arrangement of equipment for a catalytic conversion of a hydrocarbon stock utilizing one possible catalyst arrangement as disclosed by the present invention.

The hydrocarbon charge enters by line 1 and is heated in preheater 2 prior to introduction to the conversion zone. A diluent or heat carrier may be added to the charge ahead of the preheater through lines 3 and 4. The heated charge mixture then passes by transfer line 6 to catalyst chamber 7 and additional amounts of diluent may be added to the transfer line just ahead of the catalyst through line 5 and valve 8. The heated diluent passing through line 5 is raised to satisfactory temperature level usually somewhat above that in the catalyst chamber by passage through a heating coil in preheater 2 or in any other convenient manner.

The body of catalyst in chamber 7 is divided into a number of increments or sections of increasing volume in the direction of vapor flow, with four such increments, A to D, being illustrated. The reactant vapors after passage through each increment are mixed with additional amounts of superheated diluent from line 5 and a series of perforated branch lines and valves 9 extending into the free space between sections of the bed. The catalyst effluents are taken through line 10 and valve 11 to fractionators and other process equipment for the separation of diluent, products and unconverted material.

This type of catalyst chamber is very satisfactory in conversions which are favored by a relatively large ratio of catalyst bed depth to cross-sectional area. This arrangement may be extended to include any desired number of sections with the relative depth and volume of each section as well as the total depth being chosen to suit any particular charge stock and convertive reaction.

Instead of obtaining the requisite volume increase by greater sectional depth, an arrangement similar to Figure 2 may be applied. In this diagram the catalyst chamber 7 is divided into four sections of successively increasing volume but of more or less uniform depth, and the volume increase is obtained by greater diameter of the successive sections. The relative increase of diameter in the separate sections as shown in the drawing is greatly exaggerated for purposes of illustration. In actual practice, we prefer the relationship of the section diameters to be 0.5, 0.87, 1.12, and 1.37. Operation of this chamber is identical with that described in connection with Figure 1, and the pressure drop through the entire bed is somewhat lessened by the decreased total bed depth.

In still other conversions it may be more convenient and desirable to use variations of the catalyst bed arrangements of Figures 1 and 2 wherein the increased volume of successive catalyst sections is obtained by simultaneous increase in both section depth and diameter so that the progressive changes in each dimension are cooperative. This type of bed enables the maintenance of suitable total bed depth and at the same time prevents excessive pressure drop in both conversion and reactivation operations. These and other possible modifications of the above-described catalyst arrangements, including the disposition of the individual sections in separate chambers placed in series, will be discernible by those skilled in the art.

While various mechanical features of the catalyst chamber design and construction may be evolved from the foregoing disclosure, it is ordinarily preferred to arrange the catalyst in vertically spaced sections supported on trays or porous supporting members in chambers or towers of more or less conventional design. Then the free space between one supporting member and the top of the next lower section is available for injection of the heat carrier gases through any mixing and/or distributing devices which may be desirable to obtain rapid diffusion with and heat transfer to the vapor stream. Such ports or mixing devices are likewise available for fluid injection in other phases of the process such as the catalyst reactivation operation.

As indicated above, it is often desirable to add a diluent or substantially inert material to the hydrocarbon charge ahead of the catalyst zone, and even ahead of the preheater. This diluent may be the same as that employed for direct addition into the catalytic zone, or it may be a different material derived from an entirely separate source such as processing operations which produce the charge stock. However, it is ordinarily possible and satisfactory to employ the same diluent material for both applications.

The volume of diluent that is added ahead of the catalytic zone is ordinarily limited to that amount which produces beneficial operational effects without causing uneconomic increases in equipment size and the cost of handling and separating an inert material. Thus, in the catalytic cracking of relatively heavy hydrocarbon oils such as gas oil, reduced crudes and the like, it is desirable to introduce relatively large volumes of diluent at the start to reduce the charge viscosity and coking and thermal cracking in the preheater. In reforming, dehydrogenation and the like, when lighter more refractory stocks such as gasoline or light hydrocarbons are treated, the presence of diluents at this stage is usually of less importance. Further amounts of diluent may be desirable in all cases in order to satisfy predetermined reactant-diluent ratios for the conversion, and such amounts may be added ahead of the catalyst, exclusive of the volume of diluent employed for the temperature control within the conversion zone.

In the catalytic cracking of gas oil to produce lighter products, it is often preferred to add a considerable portion of the overall volume of diluent ahead of the preheater and then to add sufficient superheated diluent just ahead of the catalyst chamber to balance transfer line heat losses. An alternative method is to preheat the hydrocarbon charge to a temperature somewhat below conversion levels and to obtain conversion temperatures by admixture with requisite volumes of the superheated diluent at the entrance to the catalyst.

Within the catalyst chamber, the volume of superheated diluent to be added, and the number of injection points are governed by the magnitude of the temperature drop. This temperature drop is in turn dependent on such factors as the heat of reaction, the extent of conversion, and the concentration and specific heat of any substantially inert material in the charge. The heat loss for specific conversions may be calculated or determined experimentally, and the required volume of superheated diluent similarly determined to correspond to the desired degree of temperature control. The temperature control medium may be employed to substantially restore initial conversion temperatures at a series of points along the catalyst body, or, as is usually more practical, sufficient heat may be supplied to reduce the temperature gradient between any chosen reference points to values consistent with efficient conversion. For example, the temperature variation from catalyst inlet to outlet may be held within a range of about 10 to about 50° F. by the present invention. In contrast, under substantially adiabatic conditions, the corresponding temperature drop might range from about 70 to 100° F., even though considerable amounts of relatively inert diluent were premixed with the charge.

The increase in total vapor volume within each section of the catalyst bed due to the injection of the heat control medium is correlated in the present process with the increased volume of catalyst in that section. In this manner it is possible to wholly or partially compensate for the increase in vapor volume and to satisfactorily control the space velocity (standard gas volumes per volume of catalyst per unit of time) of the vapors. The increase in catalyst volume in the successive sections of the bed is, therefore, proportioned to the volume of superheated fluid injected above each section. The cumulative effect of this procedure is the catalyst arrangement illustrated above or a variation thereof wherein each section is of a larger volume than the preceding one. In nearly all conversions of the type described, there is a definite volume increase accompanying conversion. However, since this effect is accounted for in predetermined formulas for space velocity, contact time, etc., it does not always enter into calculations pertaining to the volume of catalyst sections for the present invention.

The number of sections and the corresponding number of injection ports may be relatively large, and it will be evident that a more uniform and nearly constant temperature may be obtained by increasing the number of injection ports for the heat control medium. However, for economic reasons involving the cost of equipment and the mechanical control of the process, the number of sections is ordinarily limited in practice and the temperature is controlled within certain desirable limits.

When the volumes of the sections of the catalyst bed have been calculated or determined experimentally in accordance with the above-described factors, these volumes are translated into corresponding depths of the catalyst in each section, depending, of course, on the type of chamber employed. The minimum depth of a single section is usually limited to values not susceptible to channeling and non-uniform flow, and the maximum depth of a section may be governed by the amount of conversion and consequent temperature loss which is permitted to occur between the points of injection of the heat control medium. The total or overall depth of the catalyst bed is similarly limited to values not causing excessive pressure drop with the vapor velocities employed.

Since the process of our invention is applicable generally to endothermic conversions over contact masses wherein heat transfer is wholly or partially a function of the vapor stream, it may be utilized with a great variety of catalytic materials and under a wide range of physical operating conditions. For example, it is capable of application in catalytic cracking, reforming, dehydrogenation and similar hydrocarbon conversions operated on stocks ranging from heavy reduced crudes to light normally gaseous hydrocarbons. In specific instances, such conditions as temperatures, pressures and flow rates will be chosen to conform to values known to favor the particular conversion.

In the cracking of gas oil and other heavy oils to produce gasoline and light products, the operating temperatue may range from about 850 to about 1050° F., while the process pressures range from atmospheric to as high as about 1000 pounds gage. Conversions involving lighter, generally more refractory stocks such as gasoline may require somewhat higher temperatures of 900° to 1300° F., often with atmospheric or low superatmospheric pressures.

The materials which are suitable for use as diluents in our process are those satisfactorily heat-stable at the temperatures employed to perform the desired functions of reducing thermal decomposition in the preheating step and furnishing sensible heat to the reactant vapors in the catalytic zone. These materials include the light refractory hydrocarbons of up to five carbon atoms or various mixtures thereof, as well as gases such as nitrogen, carbon dioxide, steam and mixtures comprising them such as substantially oxygen-free flue or combustion gases. Particularly desirable from the standpoint of availability and ease of separation from hydrocarbon products is steam, which may be considered our preferred diluent. Also suitable for many conversions are the light hydrocarbon mixtures comprising methane, ethane, propane, and butane in various ratios which are often available or may be produced in the conversion process. Or, instead of using a single type of diluent, different materials may be supplied to the process, in one case for admixture with the charge ahead of the preheater, and in the other case, for injection as a heat control medium into the catalytic zone.

The amount of diluent employed will vary, according to the charge stock and the nature of conversion, from the minimum volume required for temperature control to as high as several hundred per cent by weight of the charge. For example, in cracking gas oil to produce gasoline, the diluent may amount to from about 10 or less to about 100 or more per cent by weight of the gas oil charge.

The contact catalysts useful in our process are those having activity in promoting the desired conversion, and particularly those rugged mineral ore materials comprising bauxite, brucite, various clay-type minerals and active aluminum silicates. These natural catalysts may be used after activation by various means and/or may be promoted with minor amounts of active metals or metal salts or oxides. Also useful are natural materials comprising zirconia and titania, and synthetic preparations comprising zirconia, titania, magnesia, alumina and various silica-alumina combinations. These latter materials may be promoted with minor quantities of metal oxides, particularly those of chromium, nickel and zinc.

After periods of service in our process, these catalysts are gradually deactivated through accumulation of tarry deposits and carbonaceous residues. When their activity has declined to a degree which renders the conversion unsatisfactory, they are quickly and completely restored to substantially their original activity by reactivation at controlled temperatures in an oxidizing atmosphere. For this reactivation, it is usually preferred to pass oxygen-containing gases such as mixtures of air with steam, nitrogen, carbon dioxide, or inert combustion gas through the catalyst to burn off the materials responsible for deactivation without thereby producing combustion temperatures harmful to the catalyst. By providing a plurality of catalyst chambers, it is possible to operate continuously, with one or more chambers on stream while the spent catalyst is being reactivated.

The following examples, while implying no limitation, illustrate specific applications of the invention to the catalytic cracking of heavy hydrocarbon oils, a conversion in which the process is of particular benefit.

Example I

A catalytic gas oil cracking operation on a charge having a specific gravity of 33° A. P. I. and a boiling range of 425–700° F. was conducted with a bauxite catalyst at a catalyst inlet temperature of 985° F. and a pressure of 70 pounds gage. Each catalyst case consisted of a 4-foot diameter case divided into four zones separated by 4 inch free spaces and having the following lengths: 0.8, 1.8, 2.7, and 3.7 feet. Inlet tubes for injecting the superheated diluent were provided in the catalyst case wall at the free spaces between the latter three sections. A total of 113 cubic feet of catalyst was used in each case. The gas oil diluted with 10 per cent by weight of propane was preheated to 985° F. and passed in vapor phase into the catalyst chamber at the rate of 1.0 liquid volumes of gas oil per volume of catalyst per hour. The temperature at the end of the first zone was 954° F. and 12 pounds of propane at 1200° F. per each 90 pounds of hydrocarbon charged, were added to bring the temperature of the mixture to substantially 985° F. Similarly, about 12 pounds of superheated propane at 1200° F. per every 90 pounds of gas oil charged were added through the other two inlets at the top of the third and fourth sections of the catalyst bed. The final weight ratio of the gas oil charge to the diluent was 2:1 and minimum temperatures within the catalyst bed were substantially above 950° F. The per pass conversion during a two-hour on stream period averaged 44 volume per cent of the gas oil charge, with over 90 per cent of the converted material recovered as stabilized end-point gasoline.

When the original charge mixture (10 per cent by weight of propane) was charged to a conventional type catalyst chamber containing the same volume of catalyst in a single section, the conversion dropped to about 28 volume per cent of the gas oil due to a temperature gradient of from 985° F. at the catalyst inlet to 900° F. at the catalyst outlet.

When a mixture containing the above-mentioned final weight ratio (2:1) of gas oil and diluent was charged under the same conditions to the single section catalyst bed, the per pass conversion was only 35 volume per cent of the gas oil. The temperature gradient was from 985° F. at the inlet to 940° F. at the chamber outlet, but the mean space velocity was substantially higher and decreased conversion resulted.

Example II

A cracking operation using the same catalyst and gas oil charge as in Example I was conducted with steam diluent at a catalyst inlet temperature of 985° F. and a pressure of 75 pounds gage. Each catalyst case consisted of a 4 foot diameter case as in Example I divided into four zones having the following lengths: 0.4, 1.6, 2.9, and 4.1 feet. A total of 113 cubic feet of bauxite catalyst was used in each case. The gas oil diluted with 10 per cent by weight of steam was preheated to 985° F. and passed in the vapor phase into the catalyst chamber at the rate of 1.0 liquid volumes of gas oil per volume of catalyst per hour. The temperature at the end of the first zone was 952° F. and 17.3 pounds of steam at 1230° F. per 90 pounds of hydrocarbon charge were added to bring the temperature of the mixture to substantially 985° F. Similarly, about 17 pounds of steam at 1230° F. per every 90 pounds of gas oil were injected through the other two inlets at the top of the third and fourth sections of the catalyst bed. The final weight ratio of the gas oil charge to the diluent was 1.4 to 1 (mole ratio of 1 to 9.5) and minimum temperatures in the catalyst bed were substantially above 950° F. The per pass conversion during a four hour on-stream period averaged 48 volume per cent of the gas oil charge, with over 92 per cent of the converted material recovered was stabilized end-point gasoline.

While the foregoing discussion and exemplary operations have served to illustrate our invention and some preferred applications thereof, it will be obvious to those skilled in the art that the process described is of general application and capable of numerous modifications within the broad scope of the principles disclosed. Hence, no limitations are intended except as defined in the following claims.

We claim:

1. A process for the endothermic conversion of hydrocarbons over contact catalyst masses which comprises heating a hydrocarbon charge to substantially conversion temperature, passing the hydrocarbon in vapor form at a predetermined space velocity through a body of catalyst wherein conversion occurs with the absorption of heat, injecting into the body of catalyst at a series of points spaced in the direction of vapor flow sufficient substantially inert diluent heated to a temperature above said conversion temperature to supply a substantial proportion of the heat absorbed, successive increments of said catalyst body corresponding to the intervals between successive points of addition of said diluent being increased to correspond with the increased volume of said hydrocarbon vapor following each successive point of addition of said diluent and the mean space velocity of the vapor flow through the catalyst body being substantially maintained.

2. A process for the endothermic conversion of hydrocarbons over contact catalyst masses which comprises heating a hydrocarbon charge to a temperature sufficient to initiate reaction, passing the heated hydrocarbon charge in vapor form through a body of catalyst to promote the endothermic conversion, dividing said body of catalyst into a series of increments of increasing volume in the direction of hydrocarbon flow, injecting into the hydrocarbon vapor stream at the point of entry to each of said increments of the said catalyst body a sufficient volume of substantially inert diluent heated above conversion temperature to restore a substantial proportion of the heat abstracted by the convertive reaction in the prior increment of said catalyst body, the catalyst volume in each said successive catalyst increment being increased in an amount proportional to the increased volume of hydrocarbon vapor due to the added volume of diluent injected therein.

3. A process as in claim 2 in which the hydrocarbon charge is premixed with a substantial amount of a relatively inert diluent.

4. A process as in claim 2 in which the hydrocarbon charge is admixed with a substantial amount of steam prior to the initial heating step and steam is further added to the catalytic zone during the conversion.

5. A process for the catalytic cracking of heavy hydrocarbons to produce lower boiling products which comprises heating a charge mixture comprising heavy hydrocarbons to substantially conversion temperature, passing the heated charge in vapor form at a predetermined space velocity through a body of cracking catalyst wherein conversion occurs with the abstraction of heat, said body of catalyst being divided into a plurality of separate increments of progressively increasing volume in the direction of vapor flow, injecting into the hydrocarbon vapor stream at a plurality of points corresponding to free spaces between said separate increments sufficient substantially inert diluent to supply a major proportion of the heat abstracted in the previously traversed catalyst increment, the catalyst volume in each said successive increment being increased in an amount proportional to the increased volume of said hydrocarbon due to the added volume of diluent supplied to said increments whereby the mean space velocity of vapor-flow through the catalyst body is substantially maintained.

6. A process as in claim 5 in which the charge mixture comprises a heavy hydrocarbon and a substantial amount of a substantially inert gaseous diluent.

7. A process as in claim 5 in which the charge mixture comprises a gas oil admixed with steam and steam is injected into the catalyst body.

8. An endothermic process for the catalytic cracking of heavy hydrocarbons to produce lower boiling products which comprises pre-heating said hydrocarbons to form a gaseous charge at substantially conversion temperature, passing the gaseous charge through an elongated catalyst bed, injecting an inert heating medium at a plurality of points spaced in the direction of flow of said gaseous charge in said bed in sufficient quantity to maintain said gases at conversion temperature, the volume of said catalyst in the bed between the points at which the inert heating medium is injected increasing in the direction of gas flow.

9. An endothermic process for the catalytic cracking of heavy hydrocarbons to produce lower boiling products which comprises pre-heating said hydrocarbons to form a gaseous charge at substantially conversion temperature, passing the gaseous charge through an elongated catalyst bed, injecting an inert heating medium at a plurality of points spaced in the direction of flow of said gaseous charge in said bed in sufficient quantity to maintain said gases at conversion temperature, and increasing the volumes of catalyst succeeding each point of injection with the increases of gas volume effected by the injections of the heating medium.

10. A process for the endothermic conversion of hydrocarbons over contact catalyst masses which comprises heating a hydrocarbon charge to substantially conversion temperature, passing the hydrocarbons in vapor form through a plurality of successive increments of catalyst at a predetermined space velocity, each successive increment in the direction of flow having an increased volume, and adding a heating gas between said increments to maintain said hydrocarbon charge at conversion temperature, the mean space velocity of the hydrocarbon vapors being substantially the same for successive increments of catalyst.

11. A process for the endothermic conversion of hydrocarbons over contact catalyst masses which comprises heating a hydrocarbon charge to substantially conversion temperature, passing the hydrocarbons in vapor form through a plurality of successive increments of catalyst, each successive increment in the direction of flow having an increased volume and adding a heating gas between said increments to maintain said hydrocarbon charge at conversion temperature.

12. An endothermic process for the catalytic cracking of heavy hydrocarbons to produce lower boiling products which comprises pre-heating said hydrocarbons to form a gaseous charge at a temperature of from 850 to 1300° F., passing the gaseous charge through an elongated catalyst bed, injecting an inert heating medium at a plurality of points spaced in the direction of flow of said gaseous charge in said bed in sufficient quantity to maintain said gases at conversion temperature, the volume of said catalyst in the bed between the points at which the inert heating medium is injected increasing in the direction of gas flow.

WALTER A. SCHULZE.
CARL J. HELMERS.